United States Patent
Bluecher et al.

(10) Patent No.: US 12,554,354 B2
(45) Date of Patent: Feb. 17, 2026

(54) MICROSTRUCTURED PHASE INTERFACIAL DEVICE

(71) Applicant: BVW Holding AG, Cham (CH)

(72) Inventors: Lukas Bluecher, Eurasberg (DE); Michael Milbocker, Holliston, MA (US)

(73) Assignee: BVW Holding AG, Cham (CH)

( * ) Notice: Subject to any disclaimer, the term of this patent is extended or adjusted under 35 U.S.C. 154(b) by 794 days.

(21) Appl. No.: 17/833,976

(22) Filed: Jun. 7, 2022

(65) Prior Publication Data

US 2022/0382405 A1    Dec. 1, 2022

Related U.S. Application Data

(63) Continuation of application No. 16/178,251, filed on Nov. 1, 2018, now Pat. No. 11,372,494.

(Continued)

(51) Int. Cl.

| | |
|---|---|
| *G06F 3/041* | (2006.01) |
| *B29C 59/02* | (2006.01) |
| *B32B 3/26* | (2006.01) |
| *B32B 3/30* | (2006.01) |
| *B32B 7/06* | (2019.01) |
| *C09J 7/00* | (2018.01) |

(52) U.S. Cl.
CPC .............. *G06F 3/0414* (2013.01); *B32B 3/30* (2013.01); *B32B 7/06* (2013.01); *C09J 7/00* (2013.01); *B29C 2059/023* (2013.01); *B32B 3/26* (2013.01); *B32B 2307/744* (2013.01); *C09J 2301/31* (2020.08)

(58) Field of Classification Search
CPC .......... G06F 3/0414; B32B 3/30; B32B 7/06; B32B 3/26; B32B 2307/744; C09J 7/00; C09J 2301/03; B29C 2059/023
See application file for complete search history.

(56) References Cited

U.S. PATENT DOCUMENTS

| | | | |
|---|---|---|---|
| 5,022,186 A | 6/1991 | Rogers, Jr. | |
| 7,323,033 B2 | 1/2008 | Kroupenkine et al. | |

(Continued)

FOREIGN PATENT DOCUMENTS

| | | | |
|---|---|---|---|
| CN | 102516608 A | 6/2012 | |
| CN | 102782324 A | 11/2012 | |

(Continued)

OTHER PUBLICATIONS

Maegawa Satouru et al., "Dynamics in sliding friction of soft adhesive elastomer: Schallamach waves as a stress- relaxation mechanism", Tribology International, Elsevier Ltd, Amsterdam, NL, vol. 96, Nov. 28, 2015.

*Primary Examiner* — Alicia J Weydemeyer
*Assistant Examiner* — Laura B Figg
(74) *Attorney, Agent, or Firm* — Patterson Intellectual Property Law, P.C.; Ryan D. Levy; Mark A. Kilgore

(57) ABSTRACT

The present disclosure relates to gripping surfaces and devices comprising the same, wherein the gripping surface comprises a shape tunable surface microstructure, wherein the height, width and spatial periodicity of the microstructures corresponds to an integer multiple of Schallamach wave amplitudes and wavelengths of a target surface, wherein the device microstructures and induced Schallamach waves are entrained by applying strain to the device.

15 Claims, 9 Drawing Sheets

Related U.S. Application Data

(60) Provisional application No. 62/580,436, filed on Nov. 1, 2017.

(56) References Cited

U.S. PATENT DOCUMENTS

| | | |
|---|---|---|
| 9,120,670 B2 | 9/2015 | Hulseman et al. |
| 9,908,274 B2 | 3/2018 | Hulseman et al. |
| 9,988,201 B2 | 6/2018 | Darin et al. |
| 10,377,044 B2 | 8/2019 | Hulseman et al. |
| 10,458,053 B2 | 10/2019 | Hulseman et al. |
| 10,575,667 B2 | 3/2020 | Hulseman et al. |
| 10,687,642 B2 | 6/2020 | Hulseman et al. |
| 10,889,005 B2 | 1/2021 | Hulseman et al. |
| 2006/0202355 A1 | 9/2006 | Majidi et al. |
| 2009/0297776 A1 | 12/2009 | Crosby et al. |
| 2010/0116430 A1 | 5/2010 | Yang et al. |
| 2015/0368838 A1 | 12/2015 | Hulseman et al. |
| 2017/0014111 A1* | 1/2017 | Hulseman ............... A61B 17/00 |
| 2017/0095242 A1 | 4/2017 | Milbocker et al. |
| 2019/0062155 A1 | 2/2019 | Hulseman et al. |
| 2020/0338808 A1 | 10/2020 | Hulseman et al. |
| 2021/0086371 A1 | 3/2021 | Hulseman et al. |

FOREIGN PATENT DOCUMENTS

| | | |
|---|---|---|
| CN | 103403557 A | 11/2013 |
| WO | 2005025451 A2 | 3/2005 |
| WO | 20080121784 A1 | 10/2008 |
| WO | 2011058140 A2 | 5/2011 |
| WO | 2012057878 A1 | 5/2012 |
| WO | 20170062424 A1 | 4/2017 |
| WO | 20180208588 A1 | 11/2018 |

* cited by examiner

MICROSTRUCTURED PHASE INTERFACIAL DEVICE

CROSS-REFERENCE TO RELATED APPLICATIONS

This application is a continuation of U.S. patent application Ser. No. 16/178,251, filed on Nov. 1, 2018, which claims the benefit of priority to U.S. provisional application No. 62/580,436, filed on Nov. 1, 2017, which are hereby incorporated by reference in their entirety.

TECHNICAL FIELD

The microstructured surfaces and devices comprising the same are described herein. The surfaces and devices of the present disclosure are useful in any non-slip application intended to prevent or minimize slippage at a solid-solid interface, such as between a microstructured device and a deformable surface. The invention employs dynamical Schallamach waves, slip pulse and separation pulse pinning on hierarchically structured surfaces to obtain surfaces which grip.

BACKGROUND

While this section is largely devoted to established observations and theories, some of the material contained in this section is new with respect to interpretation or perceived application, nevertheless the underlying theory is known. Thus, the applicants do not intend that ideas disclosed in this section necessarily constitute prior art, and that some of the connections made between variant states of prior art may constitute invention.

A great variety of surface patterns are found in nature. Their function is to both repel and attract other surfaces. Complex and expensive fabrication techniques ranging from lithography to carbon nanotube synthesis have been used to create synthetic analogs to naturally occurring surfaces.

Regarding the function of natural surfaces, an aspect that is often overlooked is the kinetic changes that occur when one surface interacts with another at an interface. In many instances in nature, a first geometric interface is present primarily to induce a second geometry, which exceeds the first geometry in performance primarily because the manifestation of the second geometry can take on a multiplicity of forms.

One can generically call the induced surface geometries "wrinkled" surfaces, which are spontaneous or self-forming. Wrinkles are caused by a compressive strain on a surface and by altering the strain conditions through material properties, static surface geometry, and interface conditions. Nature has been able to demonstrate great control over wrinkle wavelength, amplitude, and orientation over large surface areas.

It is difficult to understand directly the mechanism of adhesion on deformable mostly solid surfaces because grip between surfaces is associated with the time-dependent deformation of complicated hierarchical structures. Some of these structures are predisposed on the surfaces, others are induced on the surfaces by the energy of interaction.

The classical notion of friction is a force opposing translation of a device with respect to a surface, that frictional force being a linear function of the normal force and area of contact. Classical friction, as a concept, is insufficient to describe the mechanisms of action at work on target surfaces interacting with the microstructured phase interfacial devices of the present invention.

In the absence of a more technical term, grip is the energy required to translate a device with respect to a surface which cannot be completely explained by classical notions of friction. In fact, the largest contribution to a grip force is not friction, but rather interactions between surface energies, which in turn may lead to deformation of a grip interface between a device and surface that is highly nonlinear with respect to the normal load and area of contact.

There are subtleties to grip that differ counter-intuitively to classical notions of friction. For example, for devices of the present invention, the translation force can increase when the contact area decreases. In particular, grip is usually enhanced, meaning translational force is increased, when the contact area between the device and a target surface is approximately inversely proportional to the surface area of the device.

In addition, grip as a translational force departs significantly from friction when microstructures exist on the device interface. In the present application, the microstructures on the device are designed to interact with microstructures on a target environmental surface and/or are designed to induce microstructures on a target environmental surface.

Microstructure here refers to any surface geometrical feature that is characterized by structures small compared to the device. Therefore, here the term microstructure is used generically to mean typically any structure of size 10 millimeters (mm) down to 1 nanometer (nm). When precision is required, 1-10 mm structures will be called mesoscopic, structures in the range 1000-1 microns will be called microscopic, and structures in the range 1000-1 nm will be called nanoscopic.

Many of the unexpected phenomena disclosed here, rely in part on a phenomenon known as a Schallamach wave. A Schallamach wave, by the conventional understanding, is used to describe a wave of potential detachment that sometimes arises during the frictional sliding of a deformable surface against a smooth rigid surface. However, when the Schallamach wave interfaces with a microtextured surface of a device, instead of detaching the Schallamach wave causes the device to grip the target surface. The Schallamach waves do not create detachment, they create entrainment. Entrainment is the phenomenon of a wave structure engaging with, or interlocking with, another spatially periodic structure. Schallamach waves can be initiated by microtexture on either the device or the target surface, and the waves themselves can develop on either or both of the device and target surface.

Schallamach waves can be associated with a plowing mechanism. A device designed to induce Schallamach plowing is comprised of surface microstructures oriented in opposing directions. Schallamach waves in a target surface naturally align parallel to the microstructure orientations on the device. The resulting doubly oriented Schallamach waves converge along a centerline where the amplitude of the Schallamach waves superimpose. The resulting superimposed Schallamach waves have greater amplitude than the amplitude of the parts of the Schallamach waves not in superposition. Schallamach plowing can result in two outcomes, device-surface detachment or inhibition of the formation of slip pulses. In the case where the former is inhibited and the later realized, grip dramatically increases by blocking a translational mode.

Associated with Schallamach waves, is Coulomb locking, wherein the induced microstructures interlock with existing or induced structures, wherein the periodicity of one structure is an integer multiple of the periodicity of the other structure. Coulomb locking is most effective when one of the structures has a Young's modulus larger than the Young's modulus of the other structure.

Associated with Schallamach waves, is eigen coulomb locking, a discovery here, wherein the natural resonance frequency or eigen wrinkle frequency of the target surface is matched with a spatial periodicity of the microstructure on the device. When eigen coulomb locking is employed the shear stress required to induce robust locking is 2 to 10 times less than the shear stress required to force the target surface into a Schallamach wave with a frequency far from the target surface's natural eigen wrinkle modes.

The basic mechanism utilizing the above deformation phenomena can be characterized generally as kinetic cyclic oscillation of surfaces induced by a grip force. Generally there are two periodic surfaces, one associated with the device, which can be either predisposed or induced, and the other associated with the target surface which can be either predisposed or induced. The mechanisms are best understood by focusing on the positional relationships between the structures on the device relative to the structures on the target surface.

The grip force is maximum when the center of a peak on the device is located between two peaks on the target surface. Both peaks typically undergo relative deformation. The grip force increases when deformation of a peak on the device in contact with the front part of a target peak increases, during which the device transiently plows the target peak. Thus, both increasing effects of the Coulombic interlocking and plowing of the wrinkled surface at the interlocking period account for increasing grip force. The grip force is a maximum when deformation of the device peak in contact with the front part of the target peak is considered to be the largest and deformation of the target peak in contact with the rear part of the device peak has disappeared.

Another characteristic of importance is the Larkin length. The Larkin length is defined as the characteristic length beyond which the fluctuations of the displacement field become larger than the typical size of a pinning center. If one models the device in contact with a surface as the displacement field, then inhomogeneities in either the target surface or the device can generate fluctuations in the relative motion in small regions. When those fluctuations exceed a certain size, the Larkin length, then the pinning centers are disrupted.

Ultimately, the induction of pattern either on a device or a target surface relies on differences in material properties in the context of grip. For example, if the device and target surface are comprised of the same in material and are the same regarding any dimensional or material properties, then the device and surface in the state of contact become indistinguishable. If there is any change in geometry in one, it also occurs in the other. Furthermore, if there is any change in geometry at all, the change in geometry is due to the locality of the applied force. Hence, induced geometrical change between device and surface depends on some difference between the device and target surface.

For example, it is known wrinkle wavelength and amplitude can be controlled independently through selection of material properties, surface geometry, and process parameters. The wavelength $\lambda$ of a wrinkled surface is determined by the effective elastic modulus mismatch between a stiff device and soft substrate (Ef/Es) and the thickness of the device (t):

$$\lambda = 2\pi t \left(\frac{E_f}{3E_s}\right)^{1/3}$$

It perhaps is misleading, or too simplistic, to speak of wrinkles as one type. The applicants have identified three wrinkle types: 1) Schallamach waves, 2) slip pulse and 3) separation pulse. The Schallamach wave is essentially a resonance phenomenon established between the device and the target surface. In essence, potential energy finds modes of elastic deformation where that potential energy can be stored in a stable way. Often, Schallamach waves are attributed to a steady state established under kinetic circumstances in which the stored potential energy is released by becoming kinetic through slippage.

However, this phenomenon is a consequence of superposition of two types of waves, the first wave is the Schallamach wave proper, and the second is a slip pulse. The slip pulse has an amplitude and frequency that is not contained in the resonance spectrum. The slip pulse is an elastic state corresponding to buckling, which disrupts temporarily the steady state between potential energy and resonant forms.

In some circumstances the slip pulse dissipates, and adhesion is re-established. In other circumstances, the slip pulse grows in energy, eventually reaching an amplitude where the interface is substantially disrupted. In this case the slip pulse actuates a separation pulse. In the circumstance where the slip pulse is dissipated, the separation pulse forms and is localized on the leading edge of the interface. In the case the slip pulse is not dissipated, the energy of the separation pulse is transmitted through the interaction region.

It is possible to have all three waves present simultaneously while the interface is in motion. In other words, compression waves form in the interface, a separation waveform forms on the leading edge, and energy from the separation wave leaks into the interface through the propagation of slip waves. Hence, the characteristic stick-slip phenomenon, which is properly understood in terms of the above three identified waves, is associated with distinct surface waves, each with quite different wavelength and amplitude.

The Schallamach wave is comprised of local regions of compression that propagate in the same direction as the interface motion relative to the target surface. The separation pulse, though also a local region of compression like the Schallamach wave, has fundamentally distinct properties. Firstly, the separation pulse propagates opposite in direction to the Schallamach wave and at a much lower velocity. The separation pulse is highly dependent on the normal force. Hence, for low normal force applications, it may be desirable to allow for slip pulses to develop so that propagation of the separation pulse is inhibited. Another important observation is that Schallamach waves are almost always associated with surface wrinkles, whereas a propagating separation pulse is typically devoid of surface features such as wrinkles.

In modeling dynamical interface phenomenon, it is often assumed the displacement force is constant. This is often not the case. For example, propagation of a slip pulse through the interface modulates the applied force. Hence, there can be resonance between a modulating applied force and the various spatial and temporal periodicities in the interface. This should also be taken into consideration in designing high grip devices.

The primary difference between the slip pulse and the separation pulse, is that the separation pulse results in complete disruption of the interface, while the slip pulse does not disrupt the interface, even though, in both cases translation occurs. Also, in both cases the long-time averaged interface is maintained.

In summary, under kinetic circumstances, there is a translation of device relative to target surface that is the sum of translations due to the separation pulse, the slip pulse, and the Schallamach waves. Now, within the regime where the interface was maintained, there are three characteristic speeds, the wave speed of separation pulses, wave speed of slip pulses and the wave speed of Schallamach waves. Associated with these wave speeds are the oscillation frequencies of both spatial and temporal components. Lastly, experiments reveal that interface motion arises solely due to wave propagation at the interface. It is this insight that drives the innovation disclosed here.

Another important observation is that slip pulses are nucleated by a buckling instability on the deformable surface, whether the buckling be in the device or the target surface. Separation pulses, on the other hand, are nucleated by a tensile peel off process. It is important to appreciate the independence of these two translational processes.

For example, separation pulses and Schallamach waves interact in the interface region. As the two types of waves propagated in opposite directions, they collided with each other, resulting in a single stagnant phase discontinuity. The phase discontinuity can be a drop of liquid condensate between solid phases or an air bubble that forms in a liquid interface. The formation of the phase discontinuity can occur even when the interface is stationary in the region of contact. Subsequent to formation of a phase discontinuity, a Schallamach wave nucleates on the discontinuity and propagates inside the contact region. Nucleated Schallamach waves are frequently responsible for interface disruption. Hence, surface patterning that promotes stable Schallamach waves vs random nucleated Schallamach waves typically possesses enhanced grip.

The above discussion describes the phenomenology at an interface between device and target surface that possess some adhesivity. The mechanism of adhesion can be mechanical, charge induced, or the formation of a complicated interface volume that resists remodeling. The dynamics of complex interfaces is perhaps the least understood interface of the three.

Complex interfaces form where there are at least two phases, for example solid-liquid interface. The notion of phase can be generalized when it comes to interface dynamics by considering two liquid phases with different surface energy or surface tension. Two immiscible phases can be considered two different phases. Grip can be enhanced when two liquids are forced to separate under equilibrium conditions, creating an energy deficit associated with disrupting an equilibrium state. Grip is enhanced when an equilibrium state inhibits translation motion at an interface comprised of quasi-phase separated liquids in equilibrium. When these phase separated states are caught on surface microstructure, grip increases significantly.

Adhesion is associated with the concept of surface energy. In the case of a liquid interface, surface energy is associated with wetting phenomena. Atoms or molecules at a surface of a solid or liquid have fewer bonds with neighboring atoms compared to those in the bulk of a solid or liquid. Energy is spent in breaking the bonds when a surface or interface is created. As a result, the atoms at the surface have higher energy. If a liquid droplet is placed on a solid surface, the liquid and solid surfaces come together under equilibrium at a characteristic angle called the static contact angle. The contact angle $\theta$ is related to the surface energies of the solid-hydrophobic $\gamma_{SA}$, solid-hydrophilic $\gamma_{SL}$, and hydrophilic-hydrophobic $\gamma_{LA}$ interfaces.

$$\cos\theta = \frac{\gamma SA - \gamma SL}{\gamma LA}$$

Wetting is the relationship between a liquid phase and a solid phase, and wetting is essential to fluid pinning. Wetting is characterized by a contact angle at the interface between a liquid and a solid surface. The contact angle is representative of the intermolecular interactions between the liquid and solid wherein the energy of interaction is minimized. The contact angle can also be associated with a force balance between adhesive and cohesive forces. Wetting is important in the bonding or adherence of two materials.

In addition, the contact angle typically changes whether the angle is measured on the leading edge or the trailing edge of an interface in motion. The difference between the leading contact angle and the trailing contact angle is the contact angle hysteresis. Large contact angle hysteresis is associated with large adhesion.

When a surface is microtextured, a liquid drop may have a large contact angle in which case the liquid sits on top of the microstructures. Conversely, a drop with a small contact angle flows into the microstructures. These states are called Cassie and Wenzel states, respectively. When Wenzel and Cassie states exists side by side on a microstructured surface, fluid pinning occurs. Wenzel-Cassie states are another form of adhesion between surfaces.

There are two types of wetting: non-reactive (static) wetting and active (dynamic) wetting. Adhesive force between a liquid and solid cause a liquid drop to spread across the surface of the solid (Wenzel wetting). Cohesive force within the liquid causes the drop to ball up and avoid contact with the surface (Cassie-Baxter wetting). The juxtaposition of the adhesive and cohesive forces results in fluid pinning, which is essentially a balance between the tendency for a fluid to spread adherently on a surface and the tendency for a fluid to resist attachment and spreading on a surface.

BRIEF SUMMARY

We have unexpectedly discovered that the force of translation between a surface of the present device with respect to an environmental surface is a nonlinear function of the applied normal force and the contact area. In addition, it was unexpectedly discovered the grip is usually enhanced, meaning translational force is increased, when the contact area between device and environmental surface is approximately inversely proportional to the surface area of the device.

The grip mechanism active in the present invention includes grip between hard microstructures disposed on a device and soft approximately flat environmental surfaces. In other cases the grip mechanism active in the present invention includes grip between soft microstructures on a device and hard approximately flat environmental surfaces. In still other cases, the grip mechanism in the present invention includes translational force induced microstructures that interact to inhibit translation.

Illustrative of unexpected results regarding grip on a soft textured surface, the applicants have found that parallel grooves on a device aligned orthogonal to the translation direction reduced the frictional force yet induced an oscillation in the environmental surface due to the force of translation that unexpectedly generated a large dynamical grip force, that was independent of surface contact area and normal force, and that under translation resulted in the formation of Schallamach waves.

It was found that the potential and kinetic energy in the Schallamach waves was approximately proportional to the energy expended in translation. Hence the grip mechanism was nearly entirely dynamical, as opposed to frictional forces whose greatest contribution to translation inhibition is the static coefficient of friction. Generally, the energy expended per unit translation length per unit time decreases for friction, and increases for some grip mechanisms achieved in some designs of the present invention.

Accordingly, it is one object of the present application to disclose devices with shape tunable microstructure, the depth and direction of the microstructures of the present devices can be reversibly controlled by applying strain to the device.

Another object of the present application is to disclose devices with shape tunable microstructure, the capillary action of these microstructures of the present devices can shape liquids at an environmental interface, at microscopic or nanoscopic scales, to control capillary phenomena through changes in the microstructure shape to control liquid-device alignment.

Another object of the present application is to disclose touchscreen devices possessing tunable wrinkles possessing shape dependent grip forces capable of differentiating between desired outcomes.

Another object of the present application is to disclose wearless sliding interfaces established by present devices wherein kinetic oscillation induced on shape tunable microstructure on a device where the positional relationship between the device microstructure and the microstructure on the environmental surface is designed to maximize the kinetic oscillations with respect to the shape of the microstructures (aspect ratio).

Another object of the present application is to disclose a strain tunable device wherein when the strain exceeds 1%, the strain tunable device buckles into wrinkles of wavelength $\square$ where the amplitude A of the wrinkles exhibit an inverse-quadratic relationship to wavelength that increases A in the range of 10 to 1000 microns, more typically A ranges from 25 microns to about 100 microns.

Another object of the present application is to disclose a strain tunable device wherein the aspect ratio A/$\square$ is inversely quadratic with respect to strain in the range of strain from about 0.01 to 0.20.

Another object of the present application is to disclose a strain tunable device wherein the grip is proportional to the difference in the Young's modulus of the device and the Young's modulus of the target surface.

Another object of the present application is to disclose a strain tunable device wherein the amplitude of induced Schallamach waves is proportional to the difference in the Young's modulus of the device and the Young's modulus of the target surface.

Another object of the present application is to disclose a strain tunable device wherein the device is comprised of two or more layers wherein the first contact layer possesses a different Young's modulus relative to the Young's modulus of distal layers of the device.

Another object of the present application is to disclose a strain tunable device wherein the device is comprised of hierarchical micro structures, where in each hierarchical layer is comprised of substrate material of different Young's moduli.

Another object of the present application is to disclose a strain tunable device wherein the device is comprised of hierarchical micro structures, wherein the thickness of the substrate bulk of the device is selected to create maximal grip for a target surface.

Another object of the present application is to disclose a device wherein the device is comprised of surface microstructure oriented in opposing directions, such that Schallamach waves induced in a target surface are aligned parallel to the microstructure orientations such that the doubly oriented Schallamach waves converge along a centerline where the amplitude of the Schallamach waves superimpose, creating Schallamach waves with amplitude greater than the amplitude of the parts of the Schallamach waves not in superposition.

Another object of the present application is to disclose a device comprised of surface microstructure that develops adhesion junctions between the device and the target surface, wherein the shear force is characterized by energy dissipation at regions immediately adjacent to the contact area.

Another object of the present application is to disclose a device comprised of surface microstructure that develops Coulomb locking between the device and the target surface, wherein the shear force is characterized by surface energy reduction between the device and target surface at regions within the contact area.

Another object of the present application is to disclose devices comprised of surface microstructure that develop Schallamach plowing, adhesion junctions and Coulomb locking between the device and the target surface.

Another object of the present application is to disclose a device comprised of surface microstructure that develops Coulomb locking between the device and the target surface, wherein the Coulomb locking is between a spatial periodicity of microstructures on the device and eigen wrinkles in the target surface.

Another object of the present application is to disclose a device comprised of surface microstructure that distributes the external shear stress at the interface between device surface and target surface such that the shear stress is maximally uniform over the contact area between device and target surface.

Another object of the present application is to disclose a device comprised of surface microstructure and Young's modulus that distributes the external shear stress at the interface between device surface and target surface such that the shear stress vector at each point of contact between device and target surface minimally deviates from the target vector at that point.

Another object of the present application is to disclose a device comprised of surface microstructure and and internal structure such that the pattern of the device in contact with the target surface inhibits sequential interfacial slip by increasing the elastic coupling between device pattern and target surface periodicity.

Another object of the present application is to disclose a device comprised of surface microstructure divisible into two types. A first type microstructure is low modulus and is designed for small normal loads, where weak pinning is expected, where the grip due to spatial fluctuations of the forces is established where the region of grip is less than the Larkin length where elastic deformation prevails. A second type microstructure is high modulus and is designed for high loads, where the length pattern is greater than the Larkin length, where the disorder potential dominates, and different parts of the pattern interface do not deform, and hold fixed the pinning centers.

Another object of the present application is to disclose a device comprised of surface microstructure interacts with a target surface to induce surface deformations that enhance grip, the device comprised of known elastic moduli and interfacial properties that achieve an optimal scaling relationship between the adherence force, device material properties, and induced wrinkle geometry.

Another object of the present application is to disclose a device with the ability to grip a target surface strongly and then reversibly separate, repeatedly.

Another object of the present application is to disclose a device with features that interface, separately or in combination, with 1) the Schallamach wave, 2) the slip pulse and 3) the separation pulse.

Another object of the present application is to disclose a device with features that control the propagation of Schallamach waves, slip pulses and separation pulses through the interface region between the device and a target surface.

These and other objects, features and advantages of the present invention will become more apparent upon reading the following specification in conjunction with the accompanying drawing figures.

DETAILED DESCRIPTION

Figure 1A:
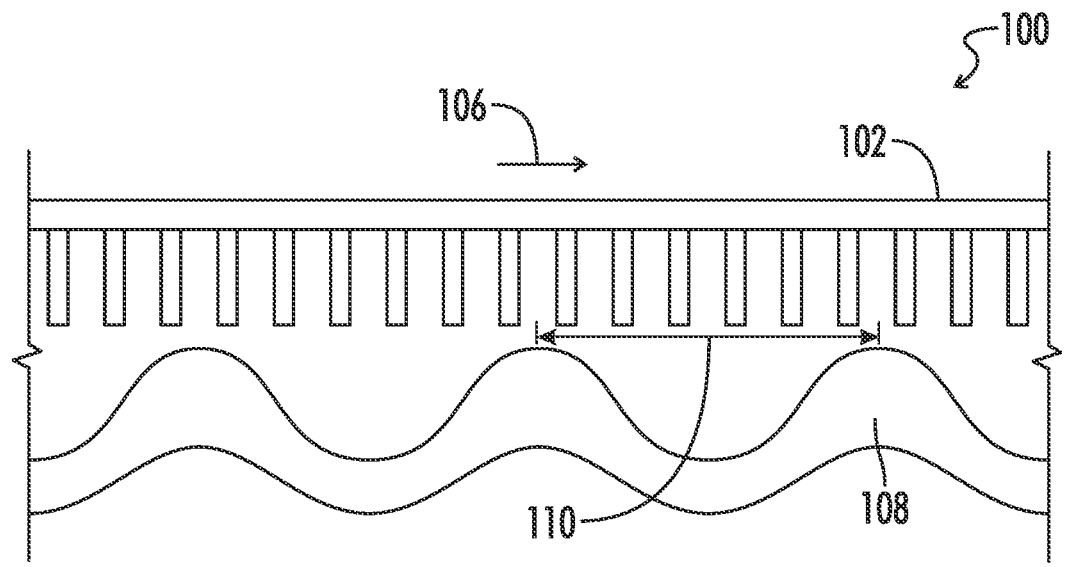
FIGS. 1A and 1B Depict a Schallamach entrainment mechanism of eigen Coulomb locking between device and deformable surface.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

Whatever the interface, surface texture plays a large role in the mobility of one surface with respect to the other. A scale of interaction between a microstructured surface and a deformable surface is defined by the surface texture of the microstructured device. The microstructure is typically hierarchical, and characterized by at least three spatial scales.

It should be appreciated, that in this disclosure, hierarchical means microstructures of different spatial scale. These structures may be side by side, or stacked on top of one another. A hierarchical microstructure is defined on a two-dimensional surface characterized by dimensions x and y, and out-of-plane dimension z. Each microstructure scale can be defined by characteristic dimensions x', y' and z' residing on a two-dimensional surface described by function $f(x, y)$. Function $f(x, y)$ is not necessarily planar. A hierarchical microstructure is a set of scaled microstructures, each characterized by $(x', y', z')$, $(x'', y'', z'')$, and so on; wherein, a first microstructure resides in a region defined by $(x, y, z1)$ and a second microstructure resides in a region defined by $(x, y, z2)$, and so on. The range $z1$ spans a range of $z$ values defined by $zmin < z1 < zmax$, and so on.

A stacked hierarchical microstructure is a three-dimensional microstructure where most of the first microstructure resides in region $z1$, and most of the second microstructure resides in region $z2$, and so on, such that $z1 > z2 > \ldots$ with respect to an arbitrary set of Euclidean coordinates $(x, y, z)$. For example, a hierarchical microstructure may comprise a set of cylinders of height 10 and diameter 2 arranged on the top surfaces of cylinders arranged in a plane of height 100 and diameter 20.

A hierarchical microstructure is self-similar if the ratio of feature dimensions scale by a constant factor. The self-similarity may occur in all of the scale dimensions, or any subset of the scale dimensions. In the example of cylinders, the pitch between cylinders at various spatial scales $p1, p2, p3, \ldots$ is self-similar, if the pitches satisfy the constant ratios $p1/p2 = p2/p3 = \ldots = c$, where c is a constant. Pitch is defined as the distance between the centers of two like-structures. In most cases the pitch is constant for a given type of structure. Aspect ratio is a related measure, which is defined as the ratio of the height of a structure to its width.

Figure 1B:
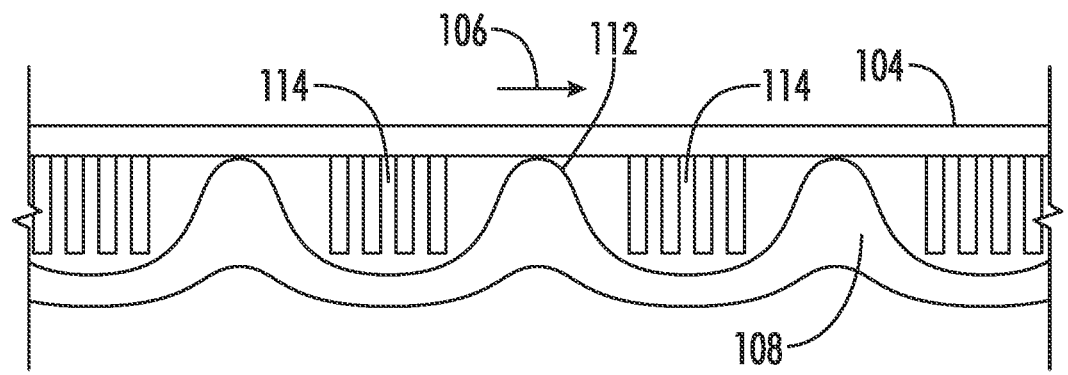

With reference to FIG. 1, the Schallamach entrainment mechanism 100 is illustrated. Depicted is a first regularly spaced parallel ridge patterned device 102 shown in cross-sectional view and a parallel ridge patterned device optimized to entrain Schallamach waves 104 is shown in cross-sectional view. Devices 102 and 104 are displaced to the right 106 with respect to deformable surface 108. A Schallamach wave develops 110. With respect to device 102, the Schallamach wave 110 reduces the surface area contact between device 102 and deformable surface 108. Consequently, in the case of device 102, the shear stress required to maintain translation 106 significantly reduces when the Schallamach wave develops. Conversely, in the case of device 104, the same Schallamach wave 110 is entrained 112 in the spacing between microstructures 114. Schallamach wave periodicity 110 is relatively independent of the periodicity of the microstructure on a contacting device. The Schallamach wavelength 110 is an innate property of the deformable surface 108. In the case of device 104, when entrainment occurs as depicted, the shear force required for translation significantly increased. Consequently, device 104 is fixed with respect to deformable surface 108.

FIG. 1 illustrates the force of translation between a surface of the present device 104 with respect to an environmental surface 108 is a nonlinear function of the applied normal force and the contact area. FIG. 1 illustrates the claim that for surface textured devices of the present invention entrainment of Schallamach waves is contrary to classical frictional models, where the shear force required for translation increases with motion. In the classical case, the static coefficient of friction is higher than the kinetic coefficient of friction.

Figure 2:
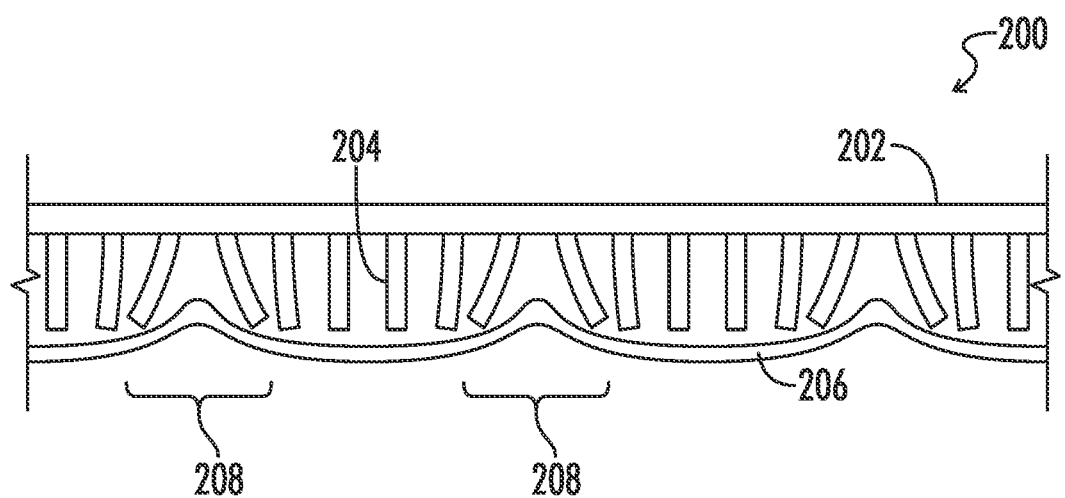
FIG. 2 Depicts a device of the present application illustrating shape tunable microstructure, the depth and direction of the microstructures of the device are reversibly controlled by applying strain to the device.

With respect to FIG. 2, a device of the present application illustrates shape tunable microstructure 200, the depth and direction of the microstructures of the device 202 can be reversibly controlled by applying strain to the device. It should be appreciated FIG. 2 is a particularly simplistic illustration of just one feature of the present invention. Device 202 with flexible microstructure 204 is translating parallel to deformable surface 206. Initially deformable surface 206 is flat. Forces between device 202 and deformable surface 206 induce Schallamach waves 208. The spacing between microstructure 204 is not tuned to the Schallamach wave 208 spatial periodicity. However, due to the deformable nature of the microstructure 204, the Schallamach wave 208 deforms the microstructure 204, wherein entrainment is achieved, as depicted.

Figure 3:
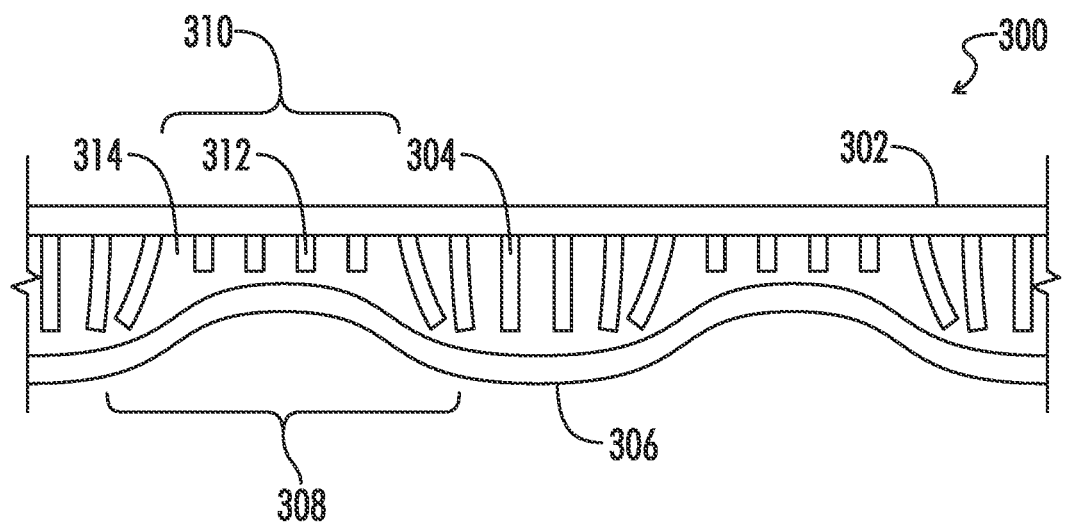
FIG. 3 Depicts a device of the present application having a shape tunable microstructure where capillary action is employed.

With respect to FIG. 3, a device of the present application illustrates shape tunable microstructure where capillary action is employed 300. It is not always practical to anticipate the Schallamach frequency of target deformable surfaces. A compromise strategy is to pattern the device according to an idealized target surface. However, immobilization of an implant can be significantly enhanced if capillary action aids in the fitting of the natural frequencies of a target deformable surface to an engineered textured surface. For example, device 302 has large microstructure 304 spaced to anticipate a target deformable surface. However, deformable surface 306 has a Schallamach spatial frequency 308 somewhat different from the anticipated engineered frequency 310. When deformable surface 306 deforms microstructures 304 the secondary capillary microstructures 312 draw the deformable surface 306 into the available gap 310. The capillary action creates a partial vacuum between deformable surface 306 and device 302 by removing water in the region 314.

Figure 4:
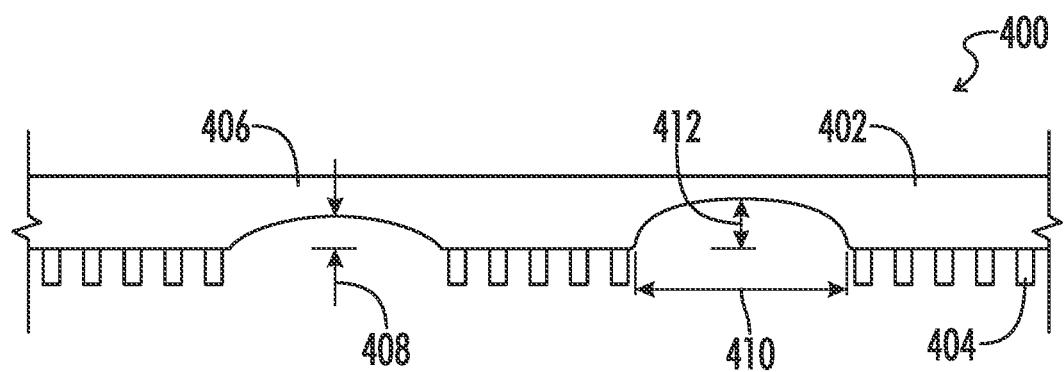
FIG. 4 Depicts a shape tunable microstructure implant wherein the deformation includes deflection of microstructures and strain to the core material.

With respect to FIG. 4, a device of the present application illustrates shape tunable microstructure implant wherein the deformation includes deflection of microstructures and strain to the core material. A strainable device of the present invention 400 includes core member 402 and microstructures 404 wherein the core member 402 is profiled 406 to strain between 1 and 20% when a typical shear force is applied. Core member 402 buckles under strain into wrinkles 408 with width 410 and amplitude 412. The profile 406 varies inversely quadratically with the aspect ratio amplitude 412 divided by width 410. Inverse quadratically means, as the strain doubles the width 410 to amplitude 412 increases by a factor of square root of 2.

Figure 5:
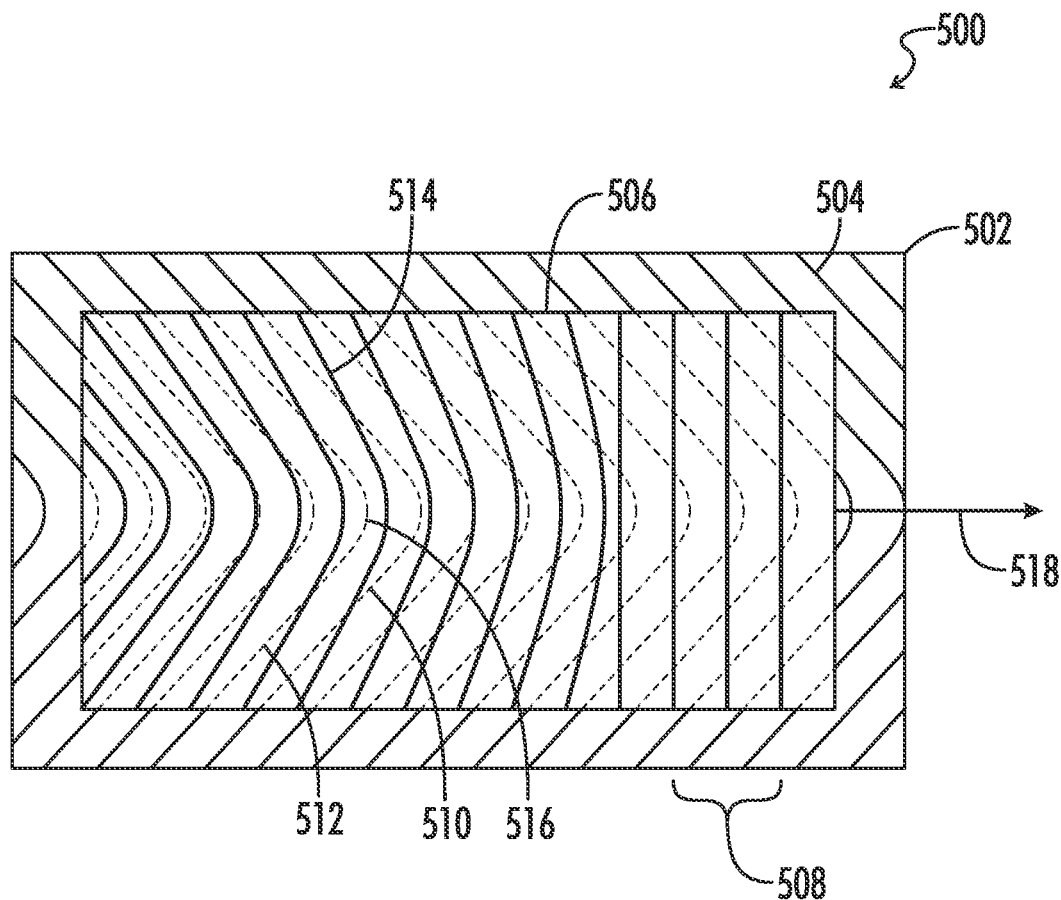
FIG. 5 Depicts an overhead view of a shape tunable microstructure implant wherein induced Schallamach waves cause microstructure plowing.

With respect to FIG. 5, a device of the present application illustrates in overhead view a shape tunable microstructure implant wherein induced Schallamach waves cause microstructure plowing. A microstructure device of the present invention 500 includes core member 502 and microstructure 504. A deformable surface 506 is translated relative to microstructure device 500. Schallamach waves 508 are directed in direction 510. Eventually the Shallamach wave splits into two parts 512 and 514, where each part is directed to an intersection point 516. Parts 512 and 514 meet at intersection point 516 and block further translation 518.

Figure 6:
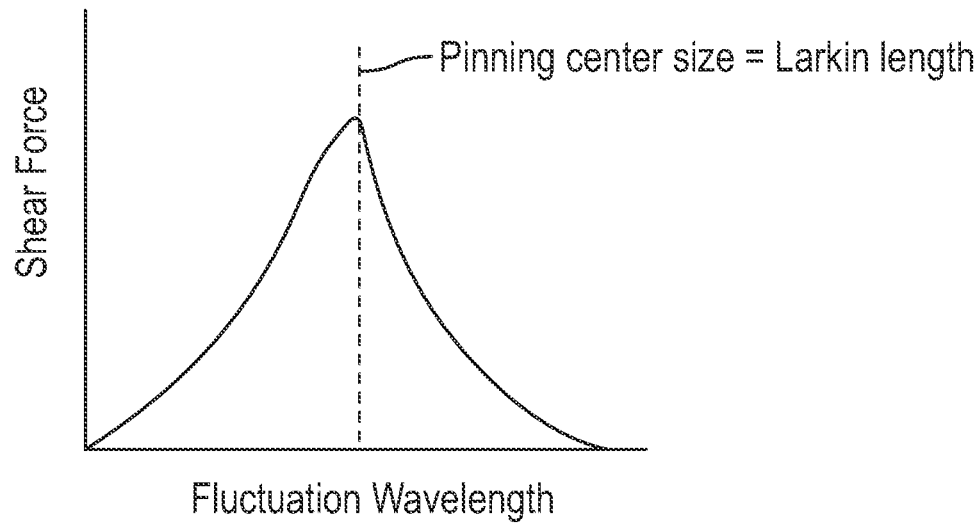
FIG. 6 Illustrates the shear force between microstructure device and deformable surface where the induced fluctuations in the deformable surface exceed the Larkin length.

With respect to FIG. 6, the shear force between microstructure device and deformable surface is illustrated, where the induced fluctuations in the deformable surface exceed the Larkin length. The Larkin length is defined as the characteristic length beyond which the fluctuations of the displacement field become larger than the typical size of a pinning center. If one models the device in contact with a surface as the displacement field, then inhomogeneities in either the target surface or the device can generate fluctuations in the relative motion in small regions. When those fluctuations exceed a certain size, the Larkin length, then the pinning centers are disrupted.

Figure 7:
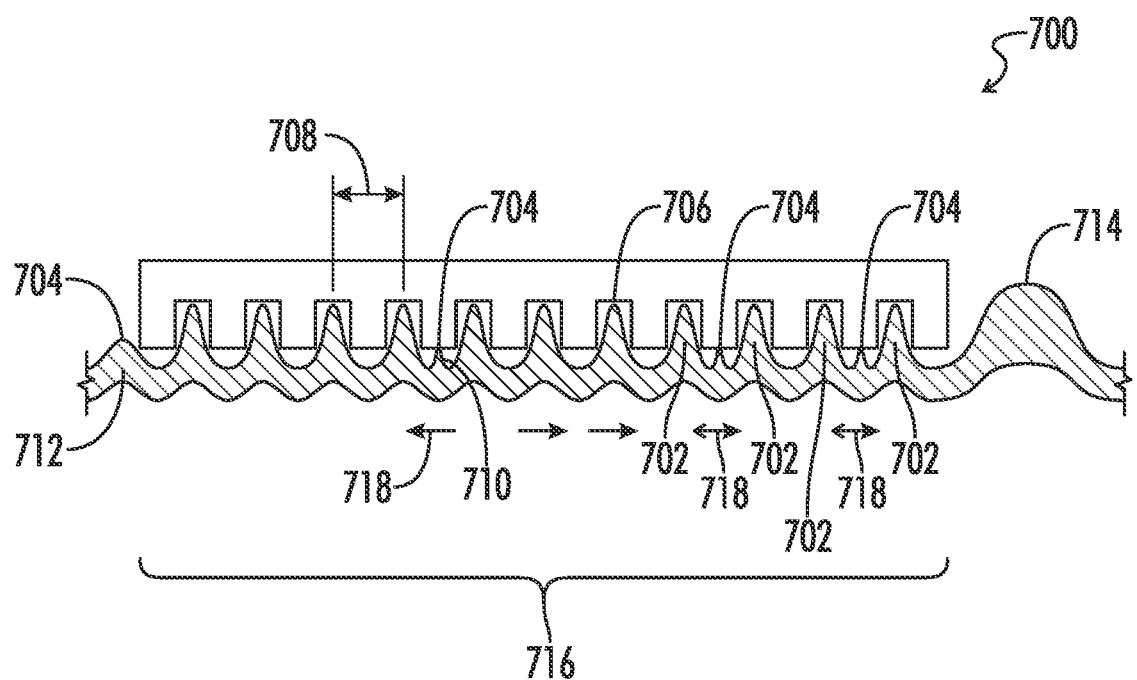
FIG. 7 depicts a device-deformable surface that provides high shear force grip by allowing periodic release of separation pulse compression energy in the form of minor slip pulses, without creating device-surface detachment.

With respect to FIG. 7, a device-deformable surface interface 700 is illustrated. The phenomenon of grip as a consequence of superposition of two types of waves, the first wave is the Schallamach wave proper 702, and the second is a slip pulse 704. The slip pulse 704 has an amplitude and frequency that is not contained in the resonance spectrum 706 where the spatial frequency of the microstructure 708 matches the spatial frequency of the Schallamach wave 702. The slip pulse 704 is an elastic state corresponding to buckling, which disrupts temporarily the steady state at 710 between potential energy and resonant forms 706.

In some circumstances the slip pulse 704 dissipates 712, and adhesion is re-established. In other circumstances, the slip pulse grows in energy, eventually reaching an amplitude where the interface is substantially disrupted. In this case the slip pulse actuates a separation pulse 714. In the circumstance where the slip pulse 704 is dissipated, the separation pulse 714 forms and is localized on the leading edge of the interface. In the case the slip pulse 704 is not dissipated, the energy of the separation pulse 714 is transmitted through the interaction region 716.

It is possible to have all three waves present simultaneously while the interface is in motion, as illustrated. In other words, compression waves form in the interface, a separation waveform 714 forms on the leading edge, and energy from the separation wave leaks 718 into the interface in the form of propagation of slip waves 704. Hence, the characteristic stick-slip phenomenon results, which is properly understood in terms of the above three identified waves, is associated with distinct surface waves, each with quite different wavelength and amplitude.

EXAMPLE 1

A touchscreen device possessing tunable wrinkles possessing shape dependent grip forces capable of differentiating between desired outcomes.

Figure 8A:
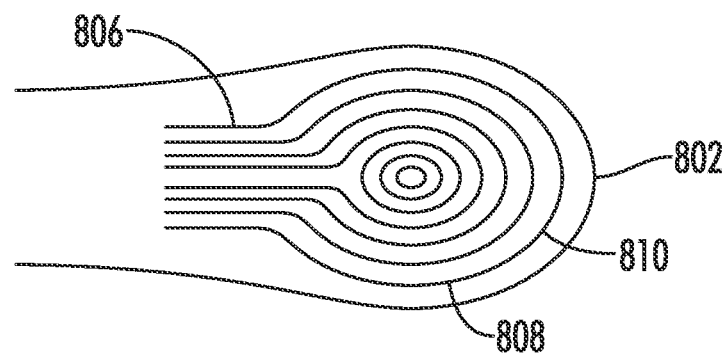
FIGS. 8A, 8B and 8C Depict a microstructure touch screen adapted to the texture of a fingertip surface.
Figure 8B:
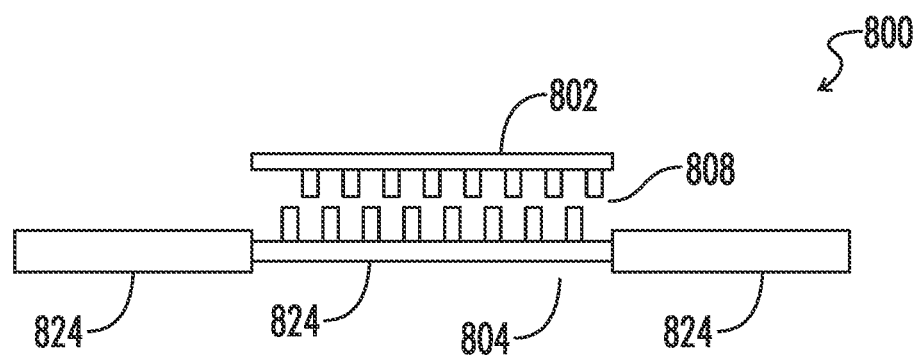
Figure 8C:
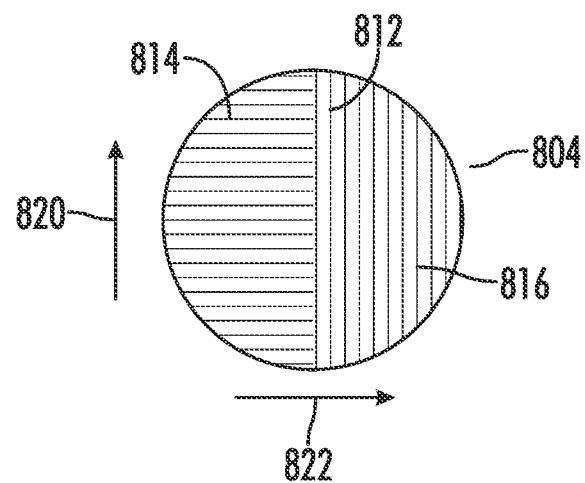

With reference to FIG. 8, a finger tip surface 802 forms an interface 800 with a textured liquid crystal touch sensitive screen 804. Fingertip surface 802 comprises a curvilinear parallel set of ridges 806 oriented in horizontal 808 and vertical 810 regions. Touch screen surface 804 comprises a rectilinear set of ridges 812 oriented in horizontal 814 and vertical 816 regions. The spatial periodicity of 808 matches the spatial periodicity of 814. The spatial periodicity of 810 matches the spatial periodicity of 816. When finger surface 802 comes in contact with screen surface 804, as shown at 818, pattern 808 locks with pattern 814 when shear force 820 is applied, and pattern 810 locks with pattern 816 when shear force 822 is applied.

It should be appreciated that translational motion is not required for the touch screen to register force in two distinct orthogonal directions 820 and 822. The touch screen texture 812 may be a elastic set of ridges, which deform slightly under shear stress. Accordingly, a highly sensitive, binary operation can be communicated to computing systems known in the art. One can tile large touch screen with a multiplicity of textured units 804, as shown at 824. The texture unit 804 can be 1 mm in diameter, more preferably between 0.5 mm and 100 microns. The texture 812 can possess a spatial periodicity considerably less than the spatial periodicity of 806, provided the texture 806 is an integer multiple of the spatial periodicity of 812.

The above exemplary invention is particularly useful in wet environments, where water condensation or contamination of a touchscreen surface typically reduces the touch screen sensitivity. The surface may optionally by superhydrophobic, or hierarchical. A hierarchical pattern may comprise a small scale serving as a hydrophobic surface and a second larger dimension texture serving as an entrainment surface.

Figure 9:
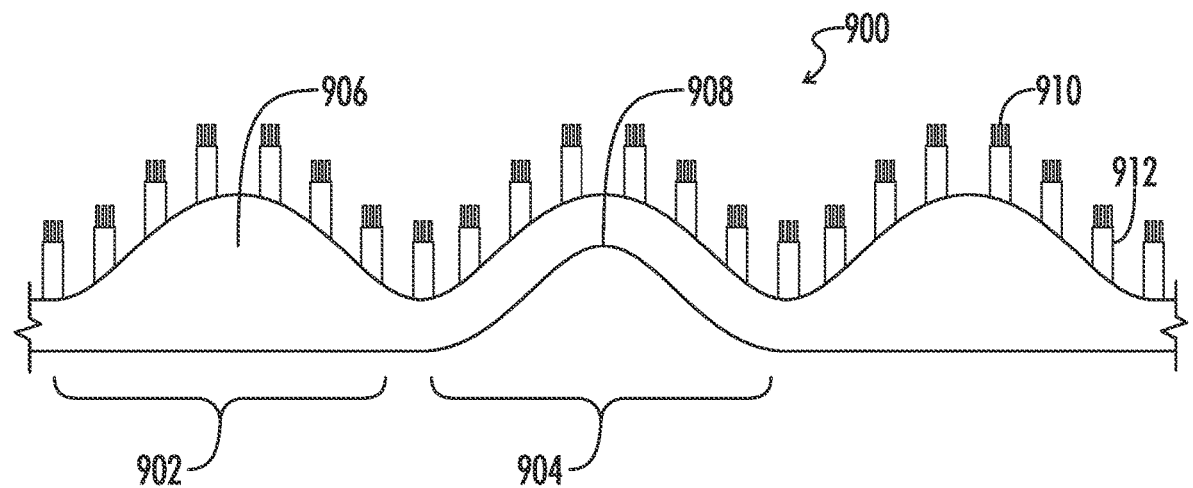
FIG. 9 Depicts a hierarchical microstructure touch screen adapted to resist fouling from water or debris.

With reference to FIG. 9, a unit surface texture 902 is illustrated on a touchscreen surface 900. A unit surface texture 902 may have a bulk thickness 906 or a following reverse pattern 908. Smallest texture 910 is comprised of pillars 5-10 microns in diameter, with spatial periodicity 5-10 microns and height 1-5 times the diameter. Surface texture 910 repels water. Medium texture 912 is comprised of pillars 10-50 microns in diameter, with spatial periodicity 50-500 micron and height 5-15 the diameter. Large texture 902 is a two-dimensional sinusoid, of amplitude 100-1000 microns.

EXAMPLE 2

Figure 10A:
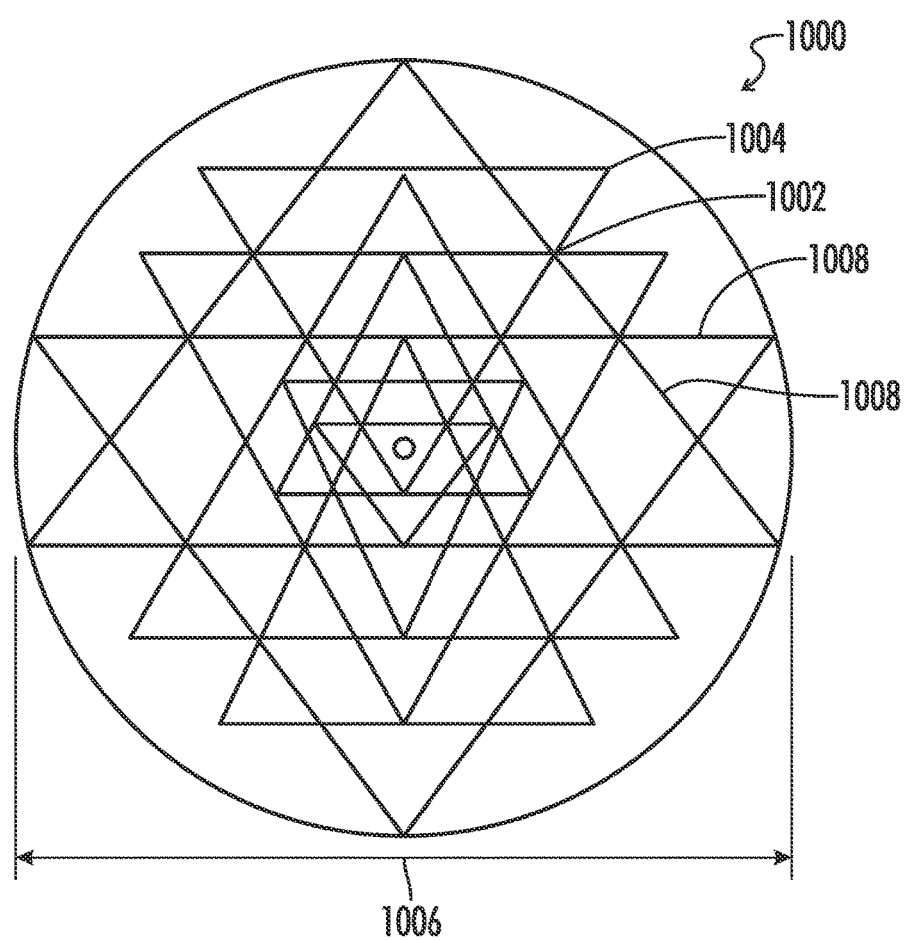
FIGS. 10A and 10B Depict a versatile shape tunable surface comprising pillars and ridges.
Figure 10B:
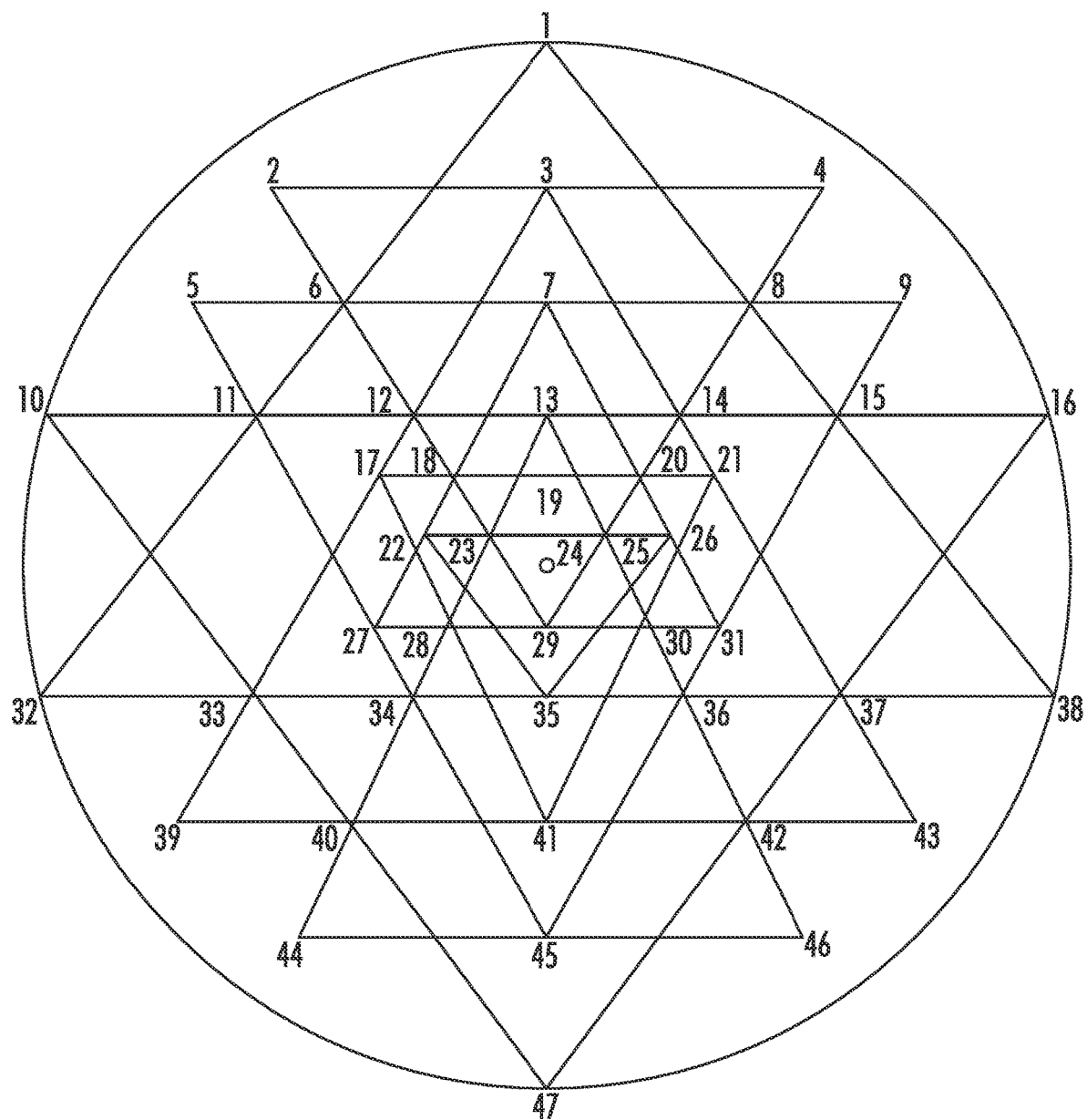

Another example of the inventions of the present application is to disclose wearless sliding interfaces established by present devices wherein kinetic oscillation induced on shape tunable microstructure on a device where the positional relationship between the device microstructure and the microstructure on the environmental surface is designed to maximize the kinetic oscillations with respect to the shape of the microstructures (aspect ratio). With reference to FIG. 10, a shape tunable surface 1000 defined by intersection points 1002 and vertex points 1004 defines the position of flexible pillars, ranging in diameter from 0.001 to 0.1 the diameter 1006 of the pattern. The height of the pillars is in the range 0.01 to 0.1 the diameter 1006. The positions of the pillars is given by the below List A with reference to FIG. 10B.

LIST A

| # | x-position | y-position |
| --- | --- | --- |
| 1 | 0 | 1 |
| 2 | −0.608622598509258 | +0.7934598493833596 |
| 3 | 0 | +0.7934598493833596 |
| 4 | +0.608622598509258 | +0.7934598493833596 |
| 5 | −0.635816922689476 | +0.4763629221075360 |
| 6 | −0.392957431667828 | +0.4763629221075360 |
| 7 | 0 | +0.4763629221075360 |
| 8 | +0.392957431667828 | +0.4763629221075360 |
| 9 | +0.635816922689476 | +0.4763629221075360 |
| 10 | −0.960156979891524 | +0.2794612208618352 |
| 11 | −0.540720052152901 | +0.2794612208618352 |
| 12 | −0.259039898580079 | +0.2794612208618352 |
| 13 | 0 | +0.2794612208618352 |
| 14 | +0.259039898580079 | +0.2794612208618352 |
| 15 | +0.540720052152901 | +0.2794612208618352 |
| 16 | +0.960156979891524 | +0.2794612208618352 |
| 17 | −0.312424461152494 | +0.1735331684773765 |
| 18 | −0.186995709167944 | +0.1735331684773765 |
| 19 | 0 | +0.1735331684773765 |
| 20 | +0.186995709167944 | +0.1735331684773765 |
| 21 | +0.312424461152494 | +0.1735331684773765 |
| 22 | −0.258935022478938 | +0.0570312197255712 |
| 23 | −0.107759961187845 | +0.0570312197255712 |
| 24 | 0 | +0.0570312197255712 |
| 25 | +0.107759961187845 | +0.0570312197255712 |
| 26 | +0.258935022478938 | +0.0570312197255712 |
| 27 | −0.356771892930644 | −0.1014104659508991 |
| 28 | −0.184519704980561 | −0.1014104659508991 |
| 29 | 0 | −0.1014104659508991 |
| 30 | −0.184519704980561 | −0.1014104659508991 |
| 31 | −0.356771892930644 | −0.1014104659508991 |
| 32 | −0.960156979891524 | −0.2794612208618352 |
| 33 | −0.540720052152901 | −0.2794612208618352 |
| 34 | −0.270779327054887 | −0.2794612208618352 |
| 35 | 0 | −0.2794612208618352 |
| 36 | −0.270779327054887 | −0.2794612208618352 |
| 37 | −0.540720052152901 | −0.2794612208618352 |
| 38 | −0.960156979891524 | −0.2794612208618352 |
| 39 | −0.650883958969493 | −0.4980534042540907 |
| 40 | −0.376680058433962 | −0.4980534042540907 |
| 41 | 0 | −0.4980534042540907 |
| 42 | +0.376680058433962 | −0.4980534042540907 |
| 43 | +0.650883958969493 | −0.4980534042540907 |
| 44 | −0.542400124699129 | −0.8401202918191951 |
| 45 | 0 | −0.8401202918191951 |
| 46 | +0.542400124699129 | −0.8401202918191951 |
| 47 | 0 | −1 |

EXAMPLE 3

Figure 11:
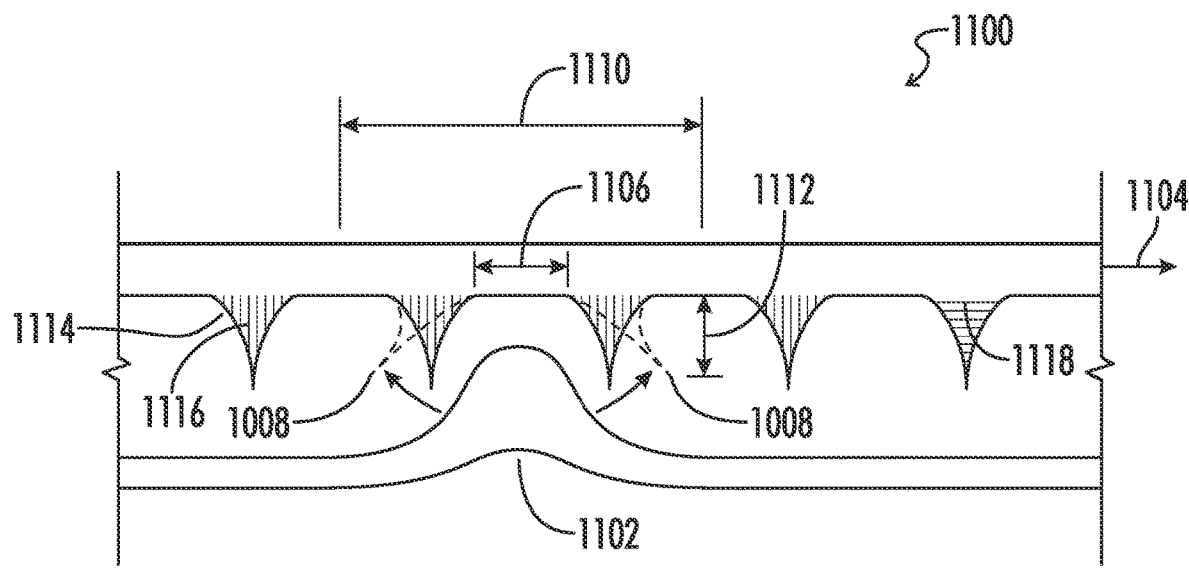
FIG. 11 Depicts an embodiment of a strain-tunable device.

With reference to FIG. 11, a strain tunable device 1100 entrains a Shallamach wave 1102 induced by strain 1104. When the device strain 1106 exceeds 1%, the strain tunable device 1100 buckles 1108 into wrinkles of wavelength 1110 where the amplitude 1112 of the wrinkles 1008 exhibit an inverse-quadratic relationship to wavelength 1110 that increases amplitude 1112 in the range of 10 to 1000 microns, more typically 1112 ranges from 25 microns to about 100 microns. Preferably, the strain tunable device wherein the aspect ratio (amplitude 1112/wavelength 1110) is inversely quadratic with respect to strain in the range of strain from about 0.01 to 0.20.

Optionally, the pillars 1114 may be tapered, as depicted, or right cylinders. Preferably, pillars 1114 have axially directed flutes or ridges 1116, or optionally concentrically directed flutes or ridges 1118.

The materials useful in EXAMPLE 3 are elastic polyurethanes or silicones. Polymers suitable for constructing patterned surfaces include polyester urethanes. Polyester urethanes are polyurethanes copolymerized with a lactide diol.

Preparation of Lactide Diol

| Compound | Source |
| --- | --- |
| 1,6-Hexanediol | Acros |
| Toluene | Acros |
| D,L-Lactide | SAFC |
| L,L-Lactide | Aldrich |
| Tin-ethylhexanoate | Sigma Aldrich |
| Chloroform | Sigma Aldrich |
| Diethylether | Sussmann |

This procedure is to be performed in closed vessels purged continuously with cryogenically distilled (dry) argon or nitrogen. 30 grams of 1,6-hexanediol is to be placed in 600 ml of toluene in a graduated 2 Liter flat bottom flask equipped with a magnetic stir rod. The flask is to be capped with a 2-hole stopper, one hole equipped with an input conduit and the other hole equipped with an output conduit connected to an oil trap (to prevent back flow of water vapor). The input conduit is to be connected to the nitrogen source and nitrogen flowed at approximately 5 Liters per hour. The flask is to be placed on a magnetic stirrer/hot top combination.

The toluene solution is to be stirred while raising the solution temperature to 70° C., and thereafter in 10° C. increments until the hexanediol is completely dissolved. Upon dissolution, the solution volume is to be noted. Temperature and nitrogen flow is to be continued until the solution volume drops by 150 ml. Temperature can be raised to 130° C. to facilitate toluene vaporization.

A sample of the solution is to be retrieved by syringe (to avoid contact with humid air), and the toluene removed by vacuum evaporation. A Karl Fischer water content measurement is to be performed on the solid hexanediol.

The above distillation procedure is to be continued until the water content is <300 ppm H2O by weight. The solution is to be cooled and stored under nitrogen.

Using the above setup, 150 grams of D,L-lactide and 150 grams of L,L-lactide are to be dissolved in 1750 ml of toluene by heating to 115° C., while stirring under nitrogen flow.

Upon dissolution the solution volume is to be noted and the temperature is to be raised to 130° C. The nitrogen flow is to be continued until 400 ml of toluene is removed.

A sample of the solution is to be retrieved by syringe (to avoid contact with humid air), and the toluene removed by vacuum evaporation. A Karl Fischer water content measurement is to be performed on the solid hexanediol.

The above distillation procedure is to be continued until the water content is <300 ppm H2O by weight. The solution is to be cooled and stored under nitrogen.

Weigh an appropriately sized flask (4 L). Note flask weight, preferably the weight includes closure means or the stopper with closed conduits disconnected. The hexanediol and lactide solutions are to be combined in the weighed flask, connected to nitrogen flow and stirred. The combined solution is to be heated in 10° C. increments to 70° C.

After 15 minutes, 600 mg of tin ethylhexanoate is to be added drop-wise using a 1 cc syringe, while stirring vigorously. The temperature of the solution is to be raised to 120° C. in 10° C. increments. [If a temperature controlled heating mantle is used, the temperature rise will be sufficiently slow that the 10° C. heating increment can be ignored.]

Turn off the nitrogen flow while keeping conduits connected such that the solution volume is closed from contact with air. While stirring and heating, react for 5 hours. Add an additional 400 mg of tin ethylhexanoate. Flush with nitrogen. Continue for an additional 3 hours. Add an additional 400 mg of tin ethylhexanoate. Flush with nitrogen. Continue for an additional 11 hours at 120° C. Reduce solution temperature to 70° C. Connect the output port of the oil trap to a vacuum source. Stop stirring and heat until toluene is removed. Discontinue vacuum. Add 800 ml of dry chloroform flush with nitrogen, stir at 70° C. until the solid is completely dissolved. The resulting turbid solution is to be filtered using a 0.2 micron PTFE filter. Remove the solvent from the filtrate under vacuum. A sample of the dried solid is to be measured for water content using Karl-Fischer. The water content is to be <300 ppm. If not within this specification, the solid can be dried by chloroform distillation.

Preparation of Polyester Urethane

Raw Materials

| Compound | Amount of substance |
| --- | --- |
| IPDI (Isophorone diisocyanate) | 202.9 mmol |
| 1,4-Butanediol | 142.8 mmol |
| Toluene | 2000 mL |
| Dibutyltin dilaurate | 11.6 mmol |
| PTMG 2000 (Terathane 2000) | 20.1 mmol |
| PLA Diol AP1756 | 40.3 mmol |

All operations are to be performed under nitrogen and dry solvents.

Suggested Equipment

A 2 Liter, four-port graduated glass reactor with central port for introduction of motor propelled stir rod is recommended. The stir rod is preferably multi-tier with angled blades to avoid laminar mixing. The reactor is to be equipped with a heating mantle fitted with a thermocouple and a programmable temperature controller. [Preferably, the mantle has cooling capability as well, in which a fluid filled mantle is used in conjunction with a circulating control unit.] Preferably the reaction volume is not exposed to the thermocouple, but rather the thermocouple is embedded in the heating mantle. Due to the high viscosity of the final product and need for rapid and complete mixing, use of a magnetic stir rod is discouraged. The two free ports are to be equipped with conduits for delivery and removal of nitrogen. The output port is to be connected to an oil trap to prevent backflow of water vapor. Ideally the conduits contain valves to provide for transport of the reaction volume without exposure to air. The last port, the diagnostic port, is to be used for addition and retrieval of reaction volume. The nitrogen atmosphere should be delivered at positive partial pressure to compensate for the external stirring means and periodic opening of the diagnostic port. The partial pressure is indicated by the observation of nitrogen bubbles in the oil trap., and the rate of their creation can be used to set and maintain a reasonable nitrogen flow rate.

Purge the reactor with nitrogen. Add 40.32 grams of PLA diol, obtained from the procedure above and 40.11 grams of Terathane 2000 and 810 ml of toluene using the above setup. Set the stir rate to 100 cycles per minute. The dissolution is accomplished by heating to 115° C., while stirring under nitrogen flow.

Upon dissolution the solution volume is to be noted and the temperature is to be raised to 130° C. The nitrogen flow is to be continued until 200 ml of toluene is removed.

Cool the reactor to 15° C. (or room temperature, if the mantle is not equipped with coolant). While stirring, add via the diagnostic port and under nitrogen flow, 30 ml toluene followed by 45.09 grams of IPDI. Stir for 30 minutes. Add drop wise, 6.74 ml dibutyltin dilaurate.

Using the diagnostic port, remove a sample of the solution to measure the % NCO. The % NCO can be measured using dibutylamine back titration. By this method, it is traditional to take at least 3 NCO measurements, or you may do so until a desired standard deviation is obtained.

Raise the temperature of the reactor to 75° C. React the mixture under nitrogen flow for 4 hours at 75° C. Take an NCO. React for another 1 hour, take an NCO. If the NCO at 5 hours is less than 95% of the measurement at 4 hours, continue to react for 1 hour durations until the NCO change is less than 5% between consecutive measurements.

Using the setup of the preparation of the PLA diol, dissolve 12.872 g of butanediol in 230 ml of dry toluene. Dissolution is accomplished by heating to 75° C.

Add the butanediol solution to the reactor. React the mixture under nitrogen flow for 9 hours at 75° C. Take an NCO. React for another 1 hour, take an NCO. If the NCO at 10 hours is less than 95% of the measurement at 9 hours, continue to react for 1 hour durations until the NCO change is less than 5% between consecutive measurements.

During the course of this procedure, toluene may be added to reduce the viscosity of the reactant and improve mixing. Considerable torque can develop during this reaction.

When the NCO has stabilized [this should be reproducible from batch to batch, if not water is entering the system], decant the reaction volume to a vacuum chamber. This is easier performed if the reaction volume is still hot. Apply vacuum and remove the toluene, and the resulting solid is to be dissolved in 1000 ml THF. The polymer is the precipitated in 15 L of pentane, filtered and repeated washed with pentane and dried under vacuum at 50° C. n-Pentane can be obtained from Acros and was used after redistillation and THF (also from Acros) was used as received.

The resulting polyester urethane has a melt temperature of 132° C. and is soluble in most solvents, for example toluene and acetone. Consequently, textured surfaces of EXAMPLE 3 can be manufacture either by solution casting over a mold, or melt extrusion over a mold.

EXAMPLE 4

Figure 12:
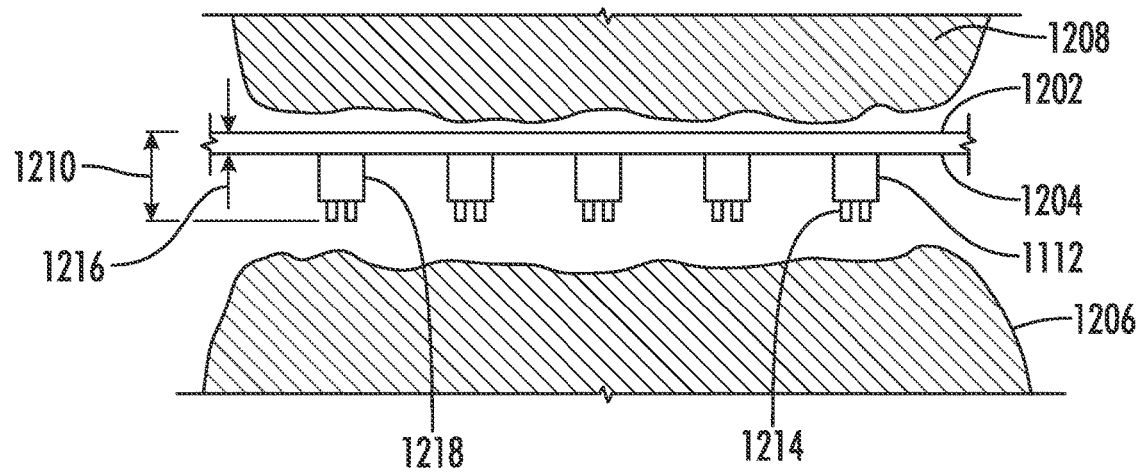
FIG. 12 Depicts a strain tunable device is depicted wherein the grip is proportional to the difference in the Young's modulus of the device and the Young's modulus of the target surface.

With reference to FIG. 12, a strain tunable device 1200 is depicted wherein the grip is proportional to the difference in the Young's modulus of the device and the Young's modulus of the target surface. Such strain tunable devices are useful as self-localizing implants. For example, the polyurethanes of EXAMPLE 3 are extremely elastic and typically have strain-at-break values of 100% to about 800%. Since most biological tissues are elastic, it is useful to construct surfaces that follow the natural elasticity of the tissue on which the device is meant to be placed without slippage. For example, the placement of an anti-adhesion barrier between tissue surfaces within a body.

Of special interest is the buckling wavelength of organs and muscle tissue, which ranges from 50 to 200 microns given the range of Young's modulus for the target tissue is in the range 25-100 kPa. Therefore, any large scale microstructure with a pitch greater than 200 microns is sufficient to stabilize a microstructured device against buckling on skin. Greater hierarchical pinning will occur for pitch closer to 50 microns, assuming the amplitude of the large scale microstructure is in the range 50-200 microns.

The matching of the Schallamach wave amplitude and frequency of tissue to the amplitude and frequency of a surface in contact with the tissue minimizes the size and roughness of the features required to localize the surface device to the target tissue. This consideration is particularly important, since any slippage between a rough surface and tissue induced tissue adhesions, an adverse event associated with many implants.

With reference to FIG. 12, and anti-adhesion implant surface 1200 has a slippery, smooth surface 1202 and a textured side 1204. Textured side 1204 is designed to adhere to tissue side 1206, and smooth side 1202 is designed to resist tissue adhesions between device side 1202 and second tissue side 1208. The thickness 1210 of device 1200 is from 20 microns to 1000 microns. Pillars 1212 are 10 to 100 microns tall, 10 to 100 microns in diameter, and spaced between 50 and 200 microns. The smaller pillars 1214 are 5 to 10 microns tall, 5 to 10 microns in diameter, and spaced between 7 and 25 microns.

By adjusting the thickness 1210 of the present example a strain tunable device is obtained wherein the amplitude of induced Schallamach waves in the tissue are proportional to the difference in the Young's modulus of the device and the Young's modulus of the target surface.

Optionally, with reference to FIG. 12, the device 1200 is comprised of two or more layers wherein the first contact layer 1216 possesses a different Young's modulus relative to the Young's modulus of distal layers 1218 of the device. In particular, the modulus of the smooth layer 1216 is different from the modulus of the microstructures 1218.

Optionally, the strain tunable device 1200 is comprised of hierarchical micro structures, where in each hierarchical layer 1112 and 1214 is comprised of substrate material of different Young's moduli.

Optionally, the strain tunable device 1200 is comprised of hierarchical micro structures, wherein the thickness 1216 of the substrate bulk of the device is selected to create maximal grip for a target surface.

EXAMPLE 5

Figure 13:
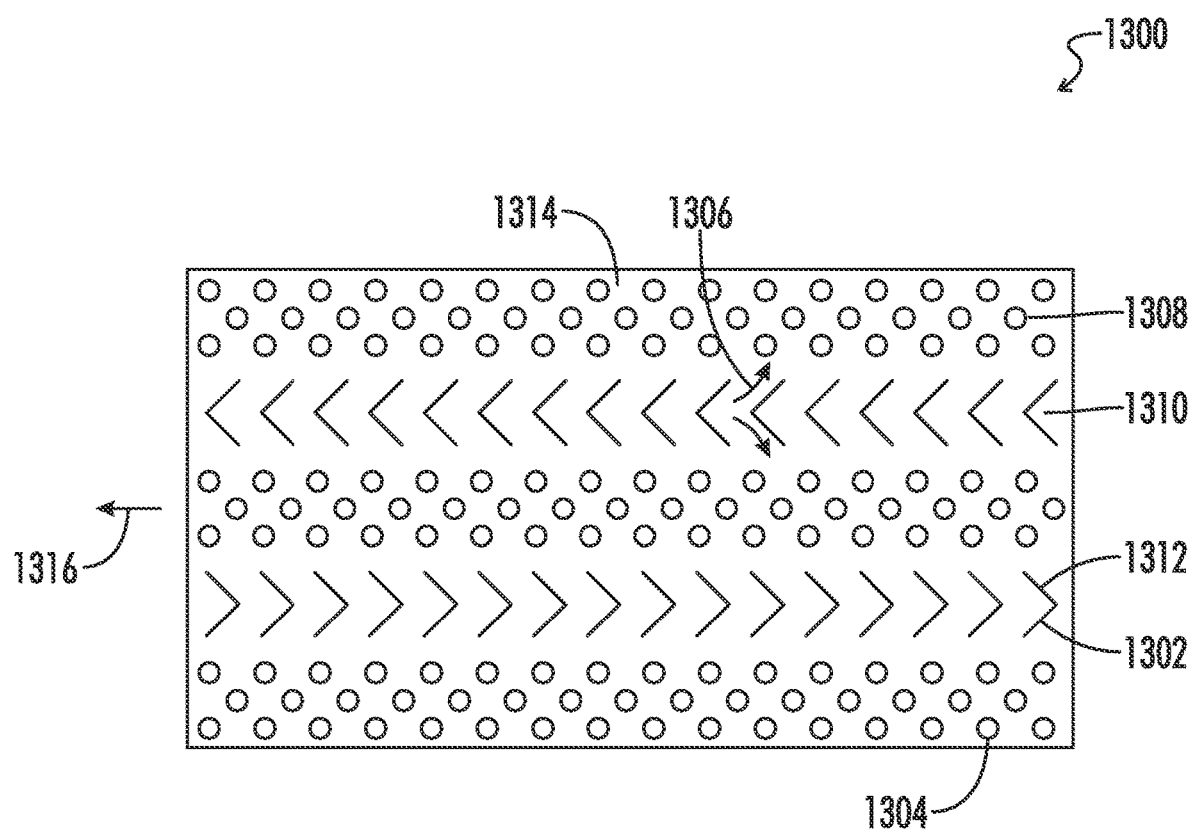
FIG. 13 Depicts a tunable device is depicted wherein the grip is enhanced by plowing Schallamach waves onto a pinning structure.

With reference to FIG. 13, a grip device of the present invention 1300 employs ridges 1302 and pillars 1304 such that tissue in contact with device 1300 under a shear force induces tissue plowing toward 1306 pillars 1304. Pillars 1304 and ridges 1302 may be arranged in strips 1308 and 1310, or in any regular pattern. The ridges 1302 have a directionality, and two ridge strips 1310 and 1312 can have their directionality reversed.

The tissue plowing 1306 induces Schallamach waves in the regions of the pillars 1308. Therefore, it is advantageous to space 1314 the pillars so that 1314 corresponds to the spatial periodicity of the induced Schallamach waves.

Therefore, one can appreciate the added grip force obtained with the grip device is comprised of surface microstructure oriented in opposing directions, such that Schallamach waves induced in a target surface are aligned parallel to the microstructure orientations such that the doubly oriented Schallamach waves converge along a centerline where the amplitude of the Schallamach waves superimpose, creating Schallamach waves with amplitude greater than the amplitude of the parts of the Schallamach waves not in superposition.

Accordingly, with reference to FIG. 13, there may be an absence of structure in the regions 1308 where surface wrinkling may accumulate without slippage. Furthermore, these accumulation regions may be oriented perpendicular (as shown) or parallel to the translation direction 1316.

One reason why surface texture arrangements generally described by EXAMPLE 5 are particularly effective in localizing the textured device is due to the surface microstructure developing adhesion junctions between the device and the target surface, wherein the shear force is characterized by energy dissipation at regions 1310 immediately adjacent to the contact area 1308. Or conversely, when 1308 is without texture.

In particular, EXAMPLE 5 develops Coulomb locking between the device and the target surface, wherein the shear force is characterized by surface energy reduction between the device and target surface at regions within the contact area.

Preferably, EXAMPLE 5 is comprised of surface microstructure that develops Schallamach plowing, adhesion junctions and Coulomb locking between the device and the target surface.

More preferably, EXAMPLE 5 is comprised of surface microstructure that develops Coulomb locking between the device and the target surface, wherein the Coulomb locking is between a spatial periodicity of microstructures on the device and eigen wrinkles in the target surface.

In still other examples of the present application, such as in EXAMPLE 4, a device comprised of surface microstructure distributes the external shear stress at the interface between device surface and target surface such that the shear stress is maximally uniform over the contact area between device and target surface. This feature is particularly useful in implant applications, or surfaces that are regularly in contact with human tissue.

A general operating principle of the present application is the disclosure of devices comprised of surface microstructure and Young's modulus that distributes the external shear stress at the interface between device surface and target surface such that the shear stress vector at each point of contact between device and target surface minimally deviates from the target vector at that point.

Another object of the present application is to disclose a device comprised of surface microstructure and and internal structure such that the pattern of the device in contact with the target surface inhibits sequential interfacial slip by increasing the elastic coupling between device pattern and target surface periodicity.

Generally, the devices of the present application are devices comprised of surface microstructure divisible into two types. A first type microstructure is low modulus and is designed for small normal loads, where weak pinning is expected, where the grip due to spatial fluctuations of the forces is established where the region of grip is less than the Larkin length where elastic deformation prevails. A second type microstructure is high modulus and is designed for high loads, where the length pattern is greater than the Larkin length, where the disorder potential dominates, and different parts of the pattern interface and do not deform, and hold fixed the pinning centers.

It can be appreciated, from the teachings given herein, that the present application discloses devices comprised of surface microstructure interacts with a target surface to induce surface deformations that enhance grip, the device comprised of known elastic moduli and interfacial properties that achieve an optimal scaling relationship between the adherence force, device material properties, and induced wrinkle geometry.

Another general feature of the present inventions are devices with the ability to grip a target surface strongly and then reversibly separate, repeatedly, without damage to the target surface.

Another general feature of the present inventions are devices with features that interface, separately or in combination, with 1) the Schallamach wave, 2) the slip pulse and 3) the separation pulse.

Another general feature of the present invention are devices with features that control the propagation of Schallamach waves, slip pulses and separation pulses through the interface region between the device and a target surface.

What is claimed is:

1. A device having a gripping surface comprising a first array of deformable microstructure features, wherein the gripping surface is disposed on a substrate, the substrate having a thickness from 20 microns to 1000 microns, wherein one or more features of the first array of deformable microstructure features includes a height from 10 microns to 100 microns, a width from 10 microns to 100 microns, and a pitch from 50 microns to 200 microns, wherein the first array of deformable microstructure features are configured to contact a target surface and wherein a shear stress applied to the deformable microstructure features causes the features to deform such that the deformation corresponds to an integer multiple of Schallamach wave amplitude and wavelength of the target surface and wherein the deformable microstructure features and Schallamach waves are entrained.

2. The device of claim 1, wherein said first array of deformable microstructure features develops capillary action between said microstructure features and said target surface, wherein liquids present between said target surface and gripping surface are drawn into one or more spaces between the deformable microstructure features, and wherein said capillary action is maintained when a strain is applied to said gripping surface.

3. The device of claim 1, wherein said device is comprised of two or more layers wherein a first layer comprises a first Young's modulus and a second layer comprises a second Young's modulus, wherein the first Young's modulus is different than the second Young's.

4. The device of claim 1, further comprising a second array of microstructure features wherein the second array of microstructure features are disposed about the gripping surface adjacent the first array of deformable microstructure features, wherein the second array of microstructure features comprise a height that is less than the height of the one or more features of the first array of deformable microstructure features.

5. The device of claim 1, wherein the first array of microstructure features comprise pillars.

6. The device of claim 1, wherein upon deformation of the first array of deformable microstructure features, the pitch between adjacent microstructure features is greater than 200 microns.

7. The device of claim 1, wherein said first array of deformable microstructure features comprises a first microstructure feature disposed about the gripping surface and a second microstructure feature disposed about the first microstructure.

8. The device of claim 7, wherein said first array of deformable microstructure features are self-similar such that a ratio of feature dimensions of the first microstructure and second microstructure scale by a constant factor.

9. The device of claim 8, wherein said first array of deformable microstructure features is resistant to wear due to sliding interfaces by said gripping surface and targe surface, wherein a kinetic oscillation induced on the first array of deformable microstructure features is configured to maximize the kinetic oscillations with respect to a shape of the microstructure features.

10. The device of claim 9, wherein said first array of deformable microstructure features are configured to deform when the shear stress exceeds 1%, wherein said first array of deformable microstructure features in combination with the shear stress causes the gripping surface to buckle into a plurality of wrinkles wherein one or more wavelength of the plurality of wavelengths having an aspect ratio of an amplitude to a wavelength being inversely quadratic with respect to shear stress in a range of from about 0.01 to 0.20.

11. The device of claim 7, wherein said first array of deformable microstructure features comprises the first microstructure feature having a first Young's modulus and the second microstructure feature comprising a second Young's modulus different than the first Young's modulus.

12. The device of claim 11 wherein the first array of microstructure features comprises a elastic polyurethane or silicone.

13. The device of claim 12 wherein the polyurethane includes a polyester urethane having a lactide diol.

14. The device of claim 1, wherein the first array of microstructure features comprise a plurality of flutes or ridges disposed about a vertical orientation along an outer surface of the microstructure feature.

15. The device of claim 14, wherein the plurality of flutes or ridges are disposed concentrically around the outer surface of the microstructure feature.

* * * * *